US008606769B1

(12) United States Patent
Berry

(10) Patent No.: US 8,606,769 B1
(45) Date of Patent: Dec. 10, 2013

(54) RANKING A URL BASED ON A LOCATION IN A SEARCH ENGINE RESULTS PAGE

(75) Inventor: Vishal Berry, New York, NY (US)

(73) Assignee: Conductor, Inc., New York, NY (US)

(*) Notice: Subject to any disclaimer, the term of this patent is extended or adjusted under 35 U.S.C. 154(b) by 49 days.

(21) Appl. No.: 12/961,994

(22) Filed: Dec. 7, 2010

(51) Int. Cl.
*G06F 17/30* (2006.01)

(52) U.S. Cl.
USPC .......................................... 707/706; 707/751

(58) Field of Classification Search
USPC ........................... 707/1, 5, 722, 748, 769, 708
See application file for complete search history.

(56) References Cited

U.S. PATENT DOCUMENTS

| | | | | |
|---|---|---|---|---|
| 7,424,469 | B2* | 9/2008 | Ratnaparkhi | 1/1 |
| 7,505,964 | B2* | 3/2009 | Tong et al. | 1/1 |
| 7,716,198 | B2* | 5/2010 | Meyerzon et al. | 707/706 |
| 7,716,202 | B2* | 5/2010 | Slackman | 707/706 |
| 7,747,632 | B2* | 6/2010 | Korn et al. | 707/751 |
| 7,801,885 | B1* | 9/2010 | Verma | 707/713 |
| 7,809,714 | B1* | 10/2010 | Smith | 707/713 |
| 7,840,413 | B2* | 11/2010 | Yoshida et al. | 705/1.1 |
| 7,853,589 | B2* | 12/2010 | Svore et al. | 707/728 |
| 8,140,566 | B2* | 3/2012 | Boerries et al. | 707/769 |
| 8,180,690 | B2* | 5/2012 | Mayle et al. | 705/27.1 |
| 8,234,275 | B2* | 7/2012 | Grant et al. | 707/732 |
| 8,255,411 | B1* | 8/2012 | Carpenter et al. | 707/764 |
| 8,301,616 | B2* | 10/2012 | Guha et al. | 707/708 |
| 2002/0026435 | A1* | 2/2002 | Wyss et al. | 707/1 |
| 2006/0004711 | A1* | 1/2006 | Naam | 707/3 |
| 2006/0277167 | A1* | 12/2006 | Gross et al. | 707/3 |
| 2008/0134033 | A1* | 6/2008 | Burns et al. | 715/705 |
| 2008/0140643 | A1* | 6/2008 | Ismalon | 707/5 |
| 2008/0208819 | A1* | 8/2008 | Wang et al. | 707/3 |
| 2009/0240677 | A1* | 9/2009 | Parekh et al. | 707/5 |
| 2009/0327270 | A1* | 12/2009 | Teevan et al. | 707/5 |
| 2010/0049682 | A1* | 2/2010 | Chow et al. | 706/46 |
| 2010/0057586 | A1* | 3/2010 | Chow | 705/26 |
| 2010/0082640 | A1* | 4/2010 | Wexler et al. | 707/748 |
| 2010/0125570 | A1* | 5/2010 | Chapelle et al. | 707/722 |
| 2010/0223250 | A1* | 9/2010 | Guha | 707/706 |
| 2010/0262601 | A1* | 10/2010 | Dumon et al. | 707/727 |
| 2010/0306249 | A1* | 12/2010 | Hill et al. | 707/769 |

* cited by examiner

*Primary Examiner* — James Trujillo
*Assistant Examiner* — Thong Vu
(74) *Attorney, Agent, or Firm* — Moritt Hock & Hamroff LLP; Steven S. Rubin, Esq.

(57) ABSTRACT

A system and method for determining a rank of a URL for a search query. A processor is effective to receive search query and a URL. The processor may send search query to a search engine and receive a result set from the search engine. The processor may determine a first rank of the URL for the search query based on the first and second result set. The processor may determine a location of the result displayed in the search engine results page and modify the first rank based on the location to produce a modified rank for the URL.

17 Claims, 4 Drawing Sheets

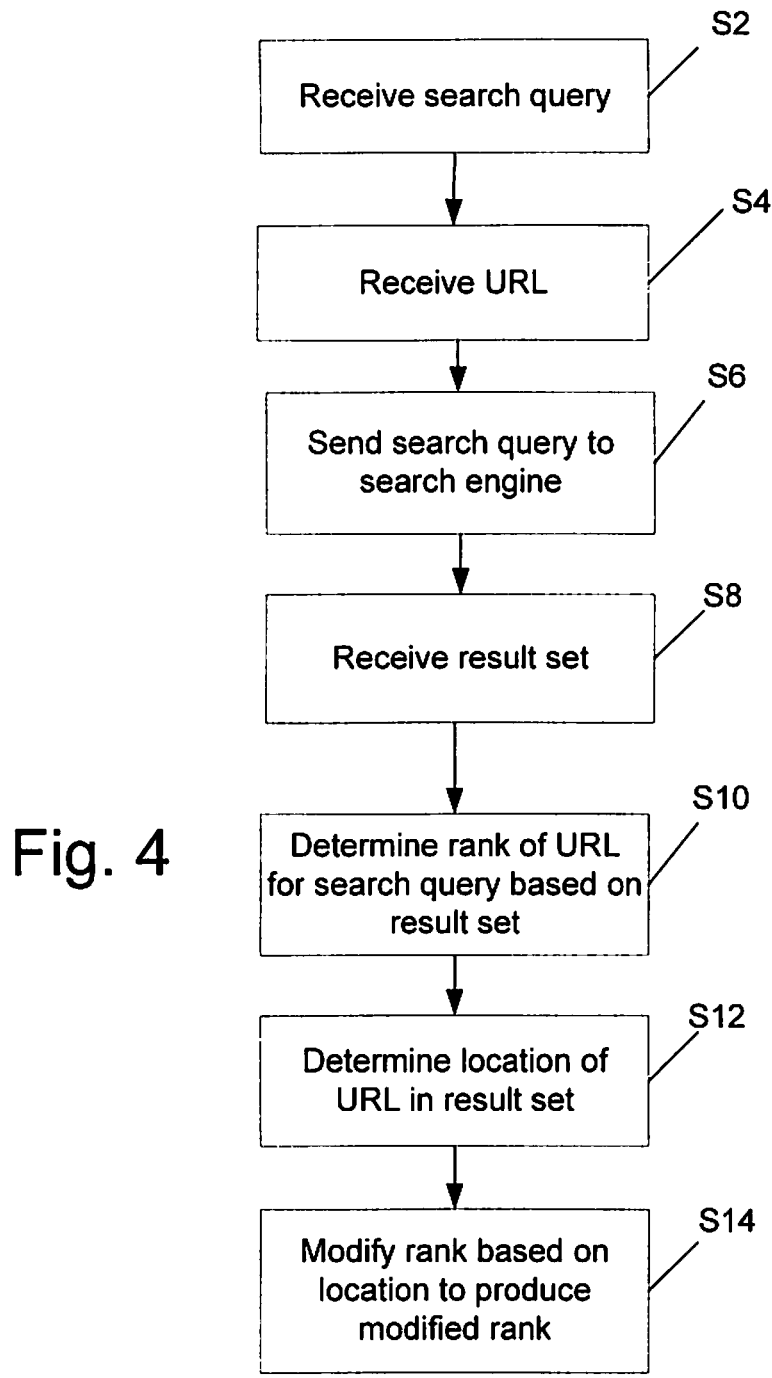

RANKING A URL BASED ON A LOCATION IN A SEARCH ENGINE RESULTS PAGE

BACKGROUND OF THE INVENTION

1. Field of the Invention

This disclosure relates to a system and method for determining a rank of a web page at an address corresponding to a uniform resource locator (URL) based on a location of the URL in a search engine results page.

2. Description of the Related Art

Referring to FIG. 1, the World Wide Web ("WWW") is a distributed database including literally billions of pages accessible through the Internet. Searching and indexing these pages to produce useful results in response to user queries is constantly a challenge. A search engine is typically used to search the WWW.

A typical prior art search engine 20 is shown in FIG. 1. Pages from the Internet or other source 22 are accessed through the use of a crawler 24. Crawler 24 aggregates pages from source 22 to ensure that these pages are searchable. Many algorithms exist for crawlers and in most cases these crawlers follow links in known hypertext documents to obtain other documents. The pages retrieved by crawler 24 are stored in a database 36. Thereafter, these pages are indexed by an indexer 26. Indexer 26 builds a searchable index of the pages in a database 34. For example, each web page may be broken down into words and respective locations of each word on the page. The pages are then indexed by the words and their respective locations.

In use, a user 32 uses a processor 38 to send a search query to a dispatcher 30. Dispatcher 30 compiles a list of search nodes in cluster 28 to execute the query and forwards the query to those selected search nodes. The search nodes in search node cluster 28 search respective parts of the index 34 and return search results along with a document identifier to dispatcher 30. Dispatcher 30 merges the received results to produce a final result set displayed to user 32 sorted by ranking scores based on a ranking function. This disclosure describes an improvement over these prior art technologies.

SUMMARY OF THE INVENTION

One embodiment of the invention is a method for determining a rank for a URL. The method may comprise sending, by a processor, a search query to a search engine and receiving, by the processor, a search engine results page from the search engine including a result with a URL. The method may further comprise determining, by the processor, a first rank of the URL based on the search engine results page; determining, by the processor, a location of the result displayed in the search engine results page; and modifying, by the processor, the first rank based on the location to produce a modified rank for the URL.

Another embodiment of the invention is a system for determining a rank for URL. The system may comprise a memory and a processor in communication with the memory. The processor may be effective to send a search query to a search engine and receive a search engine results page from the search engine including a result with a URL. The processor may be effective to determine a first rank of the URL based on the search engine results page; determine a location of the result displayed in the search engine results page; and modify the first rank based on the location to produce a modified rank for the URL.

Another embodiment of the invention is a system for determining a rank for URL. The system may comprise a memory, a processor in communication with the memory and a search engine in communication with the processor over the Internet. The processor may be effective to receive a search query, receive a URL, and send the search query to the search engine. The search engine may be effective to receive the search query and search a web index to determine results for the search query. The search engine may be effective to search another index to determine additional data for the search query generate a search engine results page including the results and the additional data; and send the search engine results page to the processor. The processor may be effective to receive the search engine results page from the search engine including a result with the URL and determine a first rank of the URL based on the search engine results page. The processor may be effective to determine a location of the result displayed in the search engine results page; and modify the first rank based on the location to produce a modified rank for the URL.

BRIEF DESCRIPTION OF THE FIGURES

The foregoing and other features of this disclosure will become more fully apparent from the following description and appended claims taken in conjunction with the accompanying drawings. Understanding that these drawings depict only some embodiments in accordance with the disclosure and are therefore not to be considered limiting of its scope, the disclosure will be described with additional specificity and detail by reference to the accompanying drawings in which:

FIG. 4 is a flow chart illustrating a process which could be performed in a accordance with an embodiment of the invention.

DETAILED DESCRIPTION OF THE PREFERRED EMBODIMENT(S)

Figure 1:
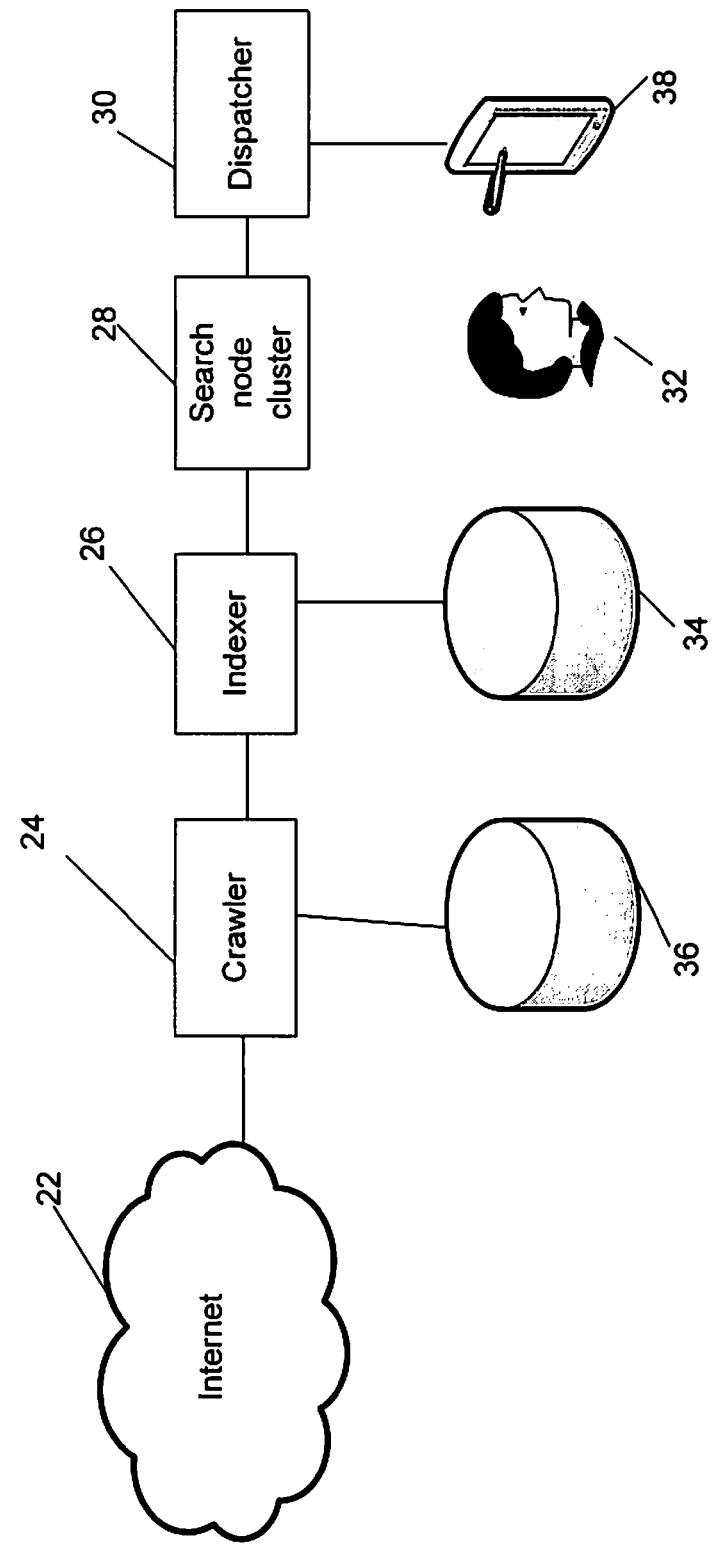
FIG. 1 is a system drawing of a search engine in accordance with the prior art.

In the following detailed description, reference is made to the accompanying drawings which form a part thereof. In the drawings, similar symbols typically identify similar components unless context indicates otherwise. The illustrative embodiments described in the detailed description, drawings and claims are not meant to be limiting. Other embodiments may be utilized and other changes may be made without departing from the spirit or scope of the subject matter presented herein. It will be readily understood that the aspects of the present disclosure as generally described herein and as illustrated in the accompanying figures can be arranged, substituted, combined, separated and/or designed in a wide variety of different configurations all of which are explicitly contemplated herein.

Figure 2:
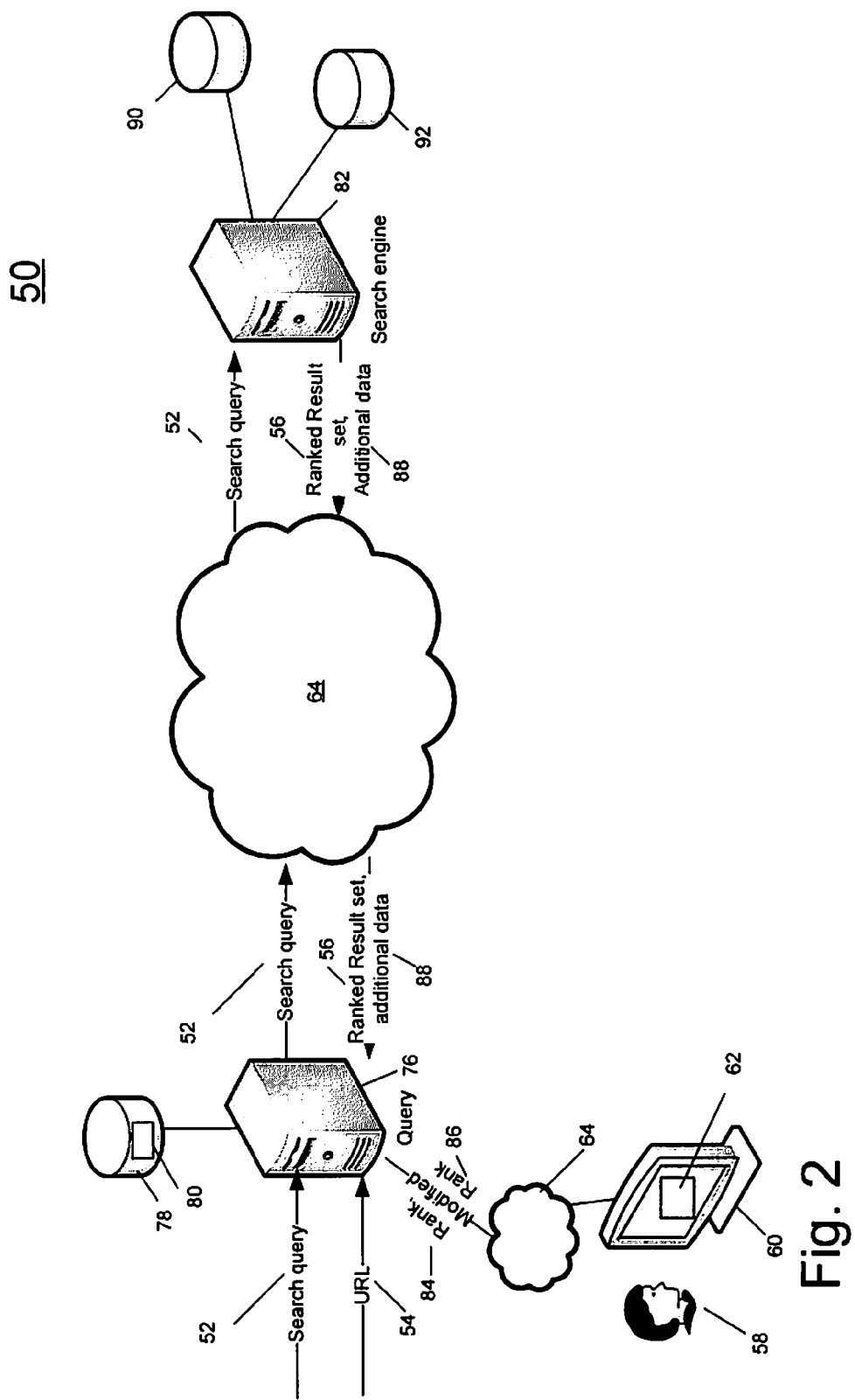
FIG. 2 is a system drawing of a system in accordance with an embodiment of the invention.

Referring to FIG. 2, there is shown a system 50 in accordance with an embodiment of the invention. A user 58 may provide a search query 52 and a URL 54 to a query processor 76. Each search query 52 could be, for example, one or more characters, symbols, phrases and/or words. Query processor 76 receives search query 52 and URL 54 and generates a report 62 indicating a rank of URL 54 in a result set generated by a search engine for search query 52. Report 62 may be displayed to user 58 on a display 60.

Query processor 76 may be in communication with user 58 and display 60 over a network 64 such as the Internet network.

Query processor 76 may further be in communication with a memory 78 including instructions 80 and with a search engine 82 over network 64.

Query processor 76 may receive search query 52 and URL 54 from user 58 or from another source. Search query 52 could include, for example, search queries relevant to a business and/or web site owned by user 58. URL 54 may include a URL relating to a web site owned by user 58 and/or a URL relating to a web site owned by competitors of user 58. Processor 76 may send each search query 52 over network 64 to search engine 82. The search engine could be, for example, the GOOGLE search engine, the YAHOO! search engine, the BING search engine, etc. Search engine 82 may receive search query 52 and search a web index 90 of the search engine for web pages and corresponding URLs that may include search query 52. Search engine 82 may generate a result set listing web pages and URLs that include search queries 52. Search engine 82 may then rank each of the URLs in the result set to produce a ranked result set 56 and send ranked result set 56 over internet 64 to query processor 76. Search engine 82 may also search other indexes 92 (such as indexes relating to advertisers, news, videos, images, etc.) for additional data 88 relating to search query 52. Search engine 82 may send additional data 88 with ranked result set 56 as is explained in more detail below.

Query processor 76 may receive ranked result set 56 and additional data 88, and generate report 62 that may be stored in memory 78 and/or displayed on display 60. Report 62 may include a rank 84 of URL 54 as shown in ranked result set 56 and may further include a modified rank 86 as is explained in more detail below.

The inventor(s) has/have determined that the rank of a URL in ranked result set 56 may not fully reflect visually a location where the URL would appear in a search engine results page. For example, ranked result set 56 may simply rank URL 54 with the rank "5". Moreover, a formatting of result set 56, such as spacing or graphics, may affect the location of URL 54 in a search engine results page. Such a rank may place the URL at various different visual locations in a search engine results page. For example, additional data such as advertisements, images, movies, maps, etc. may be placed visually at locations perceived as being prior to URL 54 and yet the URL 54 may still receive the same rank of "5". This may mean that two URLs may both receive a rank of "5" but may appear at different locations in a search engine results page. For example, one URL may appear on a search engine results page without requiring any scrolling of the page (sometimes referred to as "above the fold") while the other URL may be placed so that the user is required to scroll. One URL may appear on a first search engine results page and another URL may be placed at a location requiring a user to request a next results page on their browser.

Figure 3:
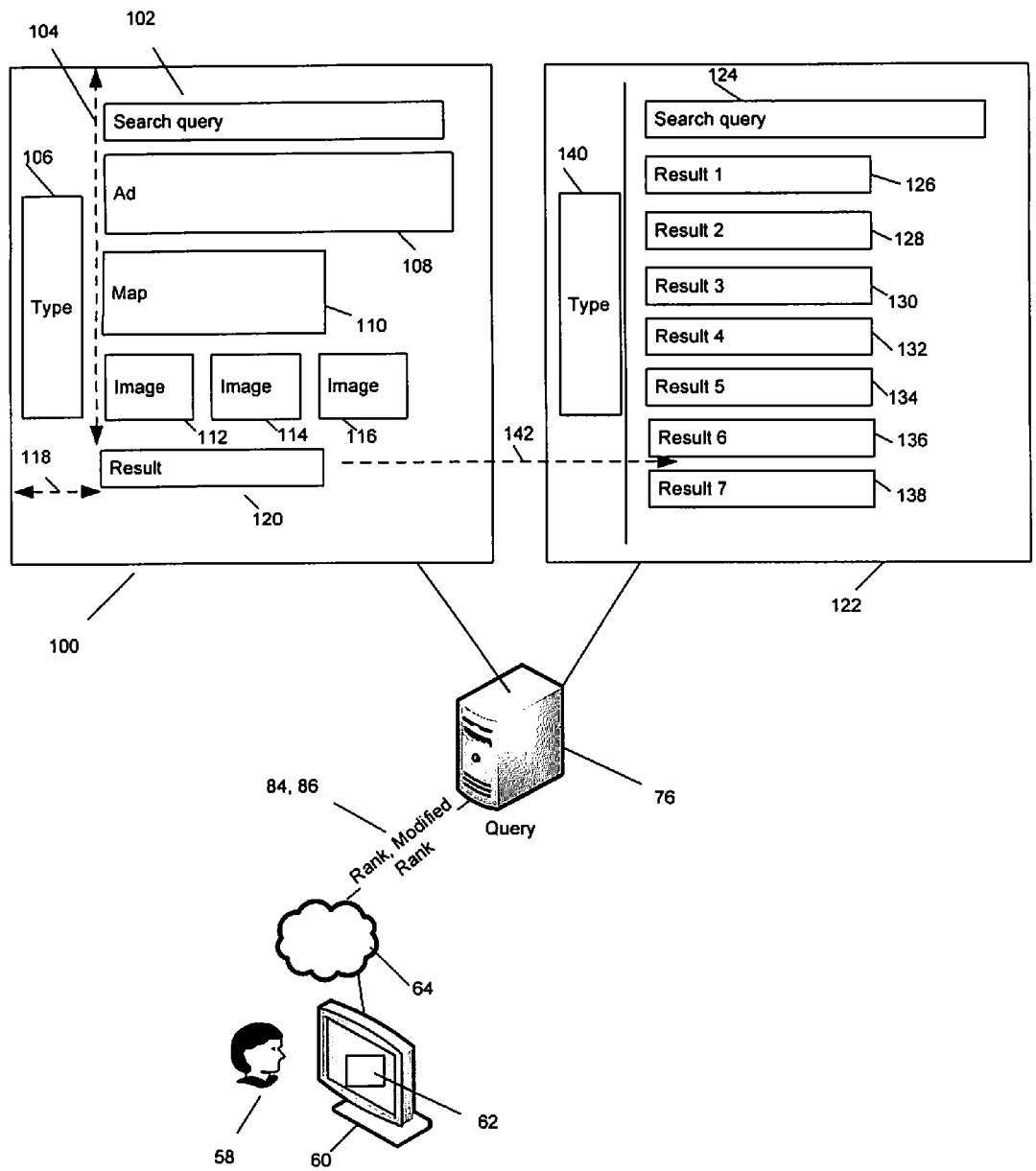
FIG. 3 is a system drawing of a system in accordance with an embodiment of the invention.

Referring also to FIG. 3, query processor 76 may compare results displayed in a first search engine results page 100 including additional data 88 with results displayed in a second search engine results page 122 without additional data 88. Additional data 88 may include formatting by a search engine such as spaces or graphics. Based on the comparison, query processor 76 can determine rank 84 and modified rank 86 for URL 54. Search engine results page 100 includes a plurality of fields and is an example of ranked result set 56 including additional data 88. Additional data 88 could include types of information such as local results, images, books, videos, maps, news, shopping, blogs, query refinements (e.g. "did you mean XX"), etc. Additional data 88 could be displayed in fields of varying sizes and may have been generated by search engine 82 from database 92 distinct from web index 90.

In an example, search engine results page 100 includes a search query field 102, a type field 106, an advertisement field 108, a map field 110, image fields 112, 114, 116, and a result field 120. Search query field 102 may include a representation of search query 52 provided by user 58. Below search query field 102 may be results area 101. Map field 110 may include a representation of a map relating to search query 52. Image fields 112, 114, 116 may include images relating to search query 52. Result field 120 may include a URL including search query 52 produced by search engine 82 from database 90. Type field 106 may list the types of data appearing in search engine result page 100.

Search engine results page 122 includes a plurality of fields and is an example of ranked result set 56 without additional data 88. For example, search engine results page 122 includes a search query field 124, a type field 140, and result fields 126, 138, 130, 132, 134, 136 and/or 138 which may include a URL including search query 52 produced by search engine 82. Type field 140 may list the types of data appearing in search engine result page 122. Below search query field 124 is a results area 125.

Result 120 in search engine results page 100 may be ranked "1" because result 120 is the first result on page 100 from web index 90. However, result 120 appears below additional data 88 including advertisement 108, map 110, and images 112, 114, 116. Result 120 thus appears lower on page 100 than if search engine 82 did not include additional data 88 in search engine results page 100.

Query processor 76 may compare search engine results page 100 including additional data 88 in results area 101 with search engine results page 122 without additional data 88 in results area 125 to determine modified rank 86. For example, query processor 76 may determine a location of result 120 in search engine results page 100 and compare that location to results in search engine results page 122. Query processor 76 may determine a vertical distance 104 between a start of result field 120 and a top edge of search engine results page 100. Query processor 76 may then map (as illustrated by arrow 142) that distance to search engine results page 122 without additional data 88 to determine what rank result 120 would have received if result 120 were displayed at the same vertical distance on search engine results page 122. In the example, result 120 may be mapped to a rank of between "6" and "7". Alternatively, ranges of vertical distances may be mapped to certain ranks. For example a vertical distance between 0 pixels and 100 pixels may get a rank of "1".

Query processor 76 may further determine a horizontal distance 118 between a start of result field 120 and a left edge of search engine results page 100. This analysis may be especially useful when multiple results are shown in a single row. For example, as most users in the United States perceive information toward the left side of a page as being more relevant, image 114 could be assigned a lower rank (such as one rank level lower) than image 112. Modified rank 86 may then be based on rank 84, and a location of result 120 including vertical distance 104 and horizontal distance 118.

Modified rank 86 could indicate, for example, rank 84 along with a mark (e.g. "5\*") indicating that additional data is displayed in search engine results page 100 above result 120. This may mean that less Internet traffic may be directed to the URL at result 120. Query processor 76 may determine a modified rank for URL 54, received by a user, and for other URLs in ranked result set 56.

Query processor 76 may determine modified rank 86 based on image factors relating to a location of result 120 in search engine results page 100. For example, query processor 76 may receive search engine results page 100 and render search engine results page 100 in a browser to produce a rendered search engine results page. Query processor 76 may perform image analysis on the rendered search engine results page and analyze image factors such as: 1) a vertical size of result 120 2) a horizontal size of result 120 3) a size of advertisements and other additional data 4) in examples where multiple results are placed in a single row, a horizontal distance from a left edge of search engine results page 100 and a particular result 120 5) a resolution of the browser and/or 6) a browser type (such as INTERNET EXPLORER, FIREFOX, CHROME, mobile, etc.).

In another example, query processor 76 may analyze search engine results page 100 and determine types of additional data 88 displayed in search engine results page 100. For example, query processor 76 may analyze the html (hypertext markup language) code of search engine results page 100 to determine the types of data. The types of data could also be determined from type field 106. Query processor 76 may then compare the type of additional data 88 with information in memory 78 to determine an amount of vertical space typically used in a search engine results page to display that type of additional data. For example, data of a "news" type may typically be displayed using X number of pixels vertically. This vertical space data can be determined for a test search engine results page knowing the type of data and refined as desired using machine learning algorithms. Knowing the types of data displayed above search result 120 and knowing the vertical space typically used by a search engine to display these types of data, query processor 76 can estimate vertical distance 104 and then determine modified rank 86.

Among other benefits, a system in accordance with the disclosure provides a better indication of a placement of a URL in a search engine results page instead of simply providing a rank assigned by a search engine. Some other systems are typically not able to provide insight into how additional data displayed by a search engine affects the visual placement of a result in a search engine results page. A system in accordance with the disclosure can provide a rank based on a visual representation of data in a search engine results page. The visual presentation can be used as a metric of the importance of a result. For example, a result may be placed below the fold even though the result may be given a relatively high rank by a search engine. A system in accordance with this disclosure can account for such a visual placement. For example, the system can distinguish a result displayed below a map from a result not displayed below a map—even if both results are given the same rank by a search engine. The modified rank discussed above provides a better representation of how much traffic is likely to go to a particular result page.

Referring to FIG. 4, there is shown a process which could be performed in accordance with an embodiment of the invention. The process could be performed using, for example, system 50 discussed above. As show, at step S2, a processor may receive a search query. At step S4, the processor may receive a URL. At step S6, the processor may send the search query to a search engine. At step S8, the processor may receive a search engine results page for the search query.

At step S10, the processor may determine a rank of the URL for the search query based on the search engine results page. At step S12, the processor may determine a location of the URL in the search engine results page. At step S14, the processor may modify the rank based on the location to produce a modified rank.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for determining a rank for a URL, the method comprising:
   sending, by a processor, a search query to a search engine;
   receiving, by the processor, a search engine results page from the search engine including a result with a URL;
   determining, by the processor, a first rank of the URL based on the search engine results page;
   rendering, by the processor, a result on the search engine results page;
   determining, by the processor, a horizontal or vertical location on the search engine results page where the result is rendered; and
   modifying, by the processor, the first rank based on the horizontal or vertical location to produce a modified rank for the URL;
   wherein determining the horizontal or vertical location includes determining a vertical distance between the result in the search engine results page and a top edge of the search engine results page.

2. The method as recited in claim 1, further comprising:
   rendering, by the processor, the search engine results page in a browser to produce a rendered search engine results page; and
   performing an image analysis on the rendered search engine results page by the processor.

3. The method as recited in claim 2, wherein: the search engine results page includes results and additional data; and
   the image analysis includes analyzing in the search engine results page, at least one of a vertical size of the result, a horizontal size of the result, a size of the additional data, a horizontal distance from a left edge of search engine results page to the result, a resolution of the browser, and a browser type.

4. The method as recited in claim 1, wherein:
   the search engine results page includes ranked results and additional data; and determining the vertical distance includes determining a type of the additional data; and determining a vertical distance relating to the type.

5. The method as recited in claim 1, wherein determining the horizontal or vertical location includes determining a horizontal distance between the result in the search engine results page and a side edge of the search engine results page.

6. The method as recited in claim 1, wherein: the search engine results page is a first search engine results page;
   the first search engine results page includes a results area including results of a first size and results or additional data of a second size; and
   modifying the first rank includes comparing the horizontal or vertical location, by the processor, to a second search engine results page with a results area including results of only the first size.

7. The method as recited in claim 1, wherein modifying the first rank includes mapping the horizontal or vertical location to a range of locations.

8. The method as recited in claim 1, wherein modifying the first rank includes mapping the vertical distance to a range of vertical distances.

9. A system for determining a rank for URL, the system comprising:
- a memory;
- a processor in communication with the memory;
- the processor effective to send a search query to a search engine;
- receive a search engine results page from the search engine including a result with a URL;
- determine a first rank of the URL based on the search engine results page;
- render a result on the search engine results page;
- determine a horizontal or vertical location on the search engine results page where the result is rendered; and
- modify the first rank based on the horizontal or vertical location to produce a modified rank for the URL;
- wherein the processor is effective to determine the horizontal or vertical location by being effective to determine a vertical distance between the result in the search engine results page and a to edge of the search engine results page.

10. The system as recited in claim 9, wherein the processor is further effective to:
- render the search engine results page in a browser to produce a rendered search engine results page; and
- perform an image analysis on the rendered search engine results page.

11. The system as recited in claim 10, wherein: the search engine results page includes results and additional data; and the processor is further effective to analyze in the search engine results page, at least one of a vertical size of the result, a horizontal size of the result, a size of the additional data, a horizontal distance from a left edge of search engine results page to the result, a resolution of the browser, and a browser type.

12. The system as recited in claim 9, wherein:
- the search engine results page includes ranked results and additional data; and the processor is effective to determine the vertical distance by being effective to determine a type of the additional data; and determine a vertical distance relating to the type.

13. The system as recited in claim 9, wherein the processor is effective to modify the first rank by being effective to map the vertical distance to a range of vertical distances.

14. The system as recited in claim 9, wherein the processor is effective to determine the horizontal or vertical location by being effective to determine a horizontal distance between the result in the search engine results page and a side edge of the search engine results page.

15. The system as recited in claim 9, wherein: the search engine results page is a first search engine results page;
- the first search engine results page includes a results area including results of a first size and results or additional data of a second size; and
- the processor is effective to modify the first rank by being effective to compare the horizontal or vertical location to a second search engine results page with a results area including results of only the first size.

16. The system as recited in claim 9, wherein the processor is effective to modify the first rank by being effective to map the horizontal or vertical location to a range of locations.

17. A system for determining a rank for URL, the system comprising:
- a memory;
- a processor in communication with the memory;
- a search engine in communication with the processor over the Internet;
- the processor effective to receive a search query;
- receive a URL;
- send the search query to the search engine;
- the search engine effective to receive the search query;
- search a web index to determine results for the search query;
- search another index to determine additional data for the search query;
- generate a search engine results page including the results and the additional data; and
- send the search engine results page to the processor;
- the processor effective to receive the search engine results page from the search engine including a result with the URL;
- determine a first rank of the URL based on the search engine results page;
- render a result on the search engine results page;
- determine a horizontal or vertical location on the search engine results page where the result is rendered; and
- modify the first rank based on the horizontal or vertical location to produce a modified rank for the URL;
- wherein the processor is further effective to:
- render the search engine results page in a browser to produce a rendered search engine results page; and perform an image analysis on the rendered search engine results page.

* * * * *